United States Patent
Li et al.

(10) Patent No.: US 12,256,254 B2
(45) Date of Patent: Mar. 18, 2025

(54) HYBRID MEASUREMENT GAP OPERATION

(71) Applicant: Apple Inc., Cupertino, CA (US)

(72) Inventors: Qiming Li, Beijing (CN); Yang Tang, San Jose, CA (US); Dawei Zhang, Saratoga, CA (US); Jie Cui, San Jose, CA (US); Huaning Niu, San Jose, CA (US); Xiang Chen, Campbell, CA (US); Manasa Raghavan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,444

(22) PCT Filed: Jan. 15, 2021

(86) PCT No.: PCT/CN2021/072028
§ 371 (c)(1),
(2) Date: Sep. 17, 2021

(87) PCT Pub. No.: WO2022/151314
PCT Pub. Date: Jul. 21, 2022

(65) Prior Publication Data
US 2023/0362696 A1 Nov. 9, 2023

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 9,867,073 | B2 * | 1/2018 | Yiu | H04W 24/10 |
| 10,412,614 | B2 * | 9/2019 | Tenny | H04L 5/0048 |
| 11,218,897 | B2 * | 1/2022 | Siomina | H04W 24/10 |

(Continued)

FOREIGN PATENT DOCUMENTS

| | | |
|---|---|---|
| CN | 110352609 A | 10/2019 |
| WO | WO 2020/122617 A1 | 6/2020 |
| WO | WO 2020/205549 A1 | 10/2020 |

OTHER PUBLICATIONS

International Search Report and Written Opinion of the International Searching Authority directed to related International Patent Application No. PCT/CN2021/072028, mailed Oct. 20, 2021; 9 pages.

(Continued)

*Primary Examiner* — Brian S Roberts
(74) *Attorney, Agent, or Firm* — Sterne, Kessler, Goldstein & Fox P.L.L.C.

(57) ABSTRACT

Apparatuses, systems, and methods for hybrid measurement gap operation. A network-side device may provide a hybrid measurement gap (MG) configuration to a wireless device, the hybrid measurement gap (MG) configuration scheduling measurement operation of the wireless device in accordance with hybrid measurement gap patterns. The wireless device may receive the hybrid measurement gap (MG) configuration, and thus perform measurement operation based on the hybrid measurement gap patterns as scheduled.

19 Claims, 6 Drawing Sheets

Acquire a hybrid measurement gap (MG) configuration scheduling measurement operation of the wireless device in accordance with combination of at least two measurement gap patterns
602

Perform measurement operation based on the combined at least two measurement gap patterns
604

(56) References Cited

U.S. PATENT DOCUMENTS

| | | | | |
|---|---|---|---|---|
| 11,683,708 | B2* | 6/2023 | Callender | H04W 24/10 370/252 |
| 2014/0341192 | A1 | 11/2014 | Venkob et al. | |
| 2015/0245235 | A1* | 8/2015 | Tang | H04W 24/10 370/252 |
| 2018/0034598 | A1* | 2/2018 | Yiu | H04W 36/0094 |
| 2018/0227717 | A1 | 8/2018 | Bhardwaj et al. | |
| 2018/0255472 | A1 | 9/2018 | Chendamarai Kannan et al. | |
| 2019/0253909 | A1 | 8/2019 | Yiu et al. | |
| 2019/0342801 | A1* | 11/2019 | Cui | H04W 72/23 |
| 2020/0154296 | A1* | 5/2020 | Siomina | H04W 24/10 |
| 2021/0083730 | A1 | 3/2021 | Hwang et al. | |
| 2022/0217562 | A1 | 7/2022 | Tang et al. | |
| 2023/0105175 | A1* | 4/2023 | Kazmi | H04W 76/18 370/329 |
| 2023/0336976 | A1 | 10/2023 | Manolakos et al. | |
| 2023/0362697 | A1 | 11/2023 | Li et al. | |
| 2024/0080694 | A1 | 3/2024 | Yang et al. | |

OTHER PUBLICATIONS

Ericsson: 'Comparison of options for signalling of per CC gap capabilities', 3GPP Draft; R4-1700632, 3GPP TSG-RAN WG4 Meeting #82, Athens, Greece, Feb. 2017; 9 pages.

International Search Report and Written Opinion of the International Searching Authority directed to International Patent Application No. PCT/CN2021/072014, mailed Oct. 14, 2021, 7 pages.

Apple, "On new positioning measurement gaps," 3GPP TSG-RAN4 Meeting #96-e, R4-2009913, Aug. 28, 2020 (Aug. 28, 2020), 5 pages.

Apple, "Work plan for measurement gap enhancement," 3GPP TSG-RAN4 Meeting #97-e, R4-2014224, Nov. 13, 2020 (Nov. 13, 2020), 4 pages.

"Requirements for support of radio resource management," Technical Specification, 3GPP TS 38.133, Release 15, Jun. 2018; 79 pages.

3GPP TS 38.104 V17.0.03GPP TS 38.104 V17.0.0, 3rd Generation Partnership Project; Technical Specification Group Radio Access Network; NR; Base Station (BS) radio transmission and reception (Release 17), Dec. 2020; 295 pages.

* cited by examiner

HYBRID MEASUREMENT GAP OPERATION

This application is a U.S. National Phase of International Application No. PCT/CN2021/072028, filed Jan. 15, 2021, which is hereby incorporated by reference in its entirety.

FIELD

The present application relates to wireless communication, and more particularly to apparatus, systems, and methods for measurement gap configuration and operation.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments relate to apparatuses, systems, and methods to provide improved measurement gap configuration and operation, particularly hybrid measurement gap operation.

According to the techniques described herein, a network-side device may provide a hybrid measurement gap (MG) configuration to a wireless device, the hybrid measurement gap (MG) configuration scheduling measurement operation of the wireless device in accordance with hybrid measurement gap patterns.

In one aspect, the hybrid measurement gap (MG) configuration may include information indicating association of measurement gap patterns with at least one frequency segment available for measurement operation, so that measurement gap pattern(s) associated with a frequency segment can be utilized when a measurement operation is to be performed at the frequency segment. In another aspect, the measurement gap pattern can be selected from a group comprising: a pre-configuration measurement gap pattern, a multiple concurrent and independent measurement gap pattern; and a Network Controlled Small Gap (NCSG) pattern.

In accordance with the hybrid measurement gap (MG) configuration, the wireless device may perform measurement operation based on the hybrid measurement gap patterns as scheduled. In one aspect, the wireless device can perform the measurement operation at a frequency segment in accordance with the measurement gap pattern(s) associated with the frequency segment.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
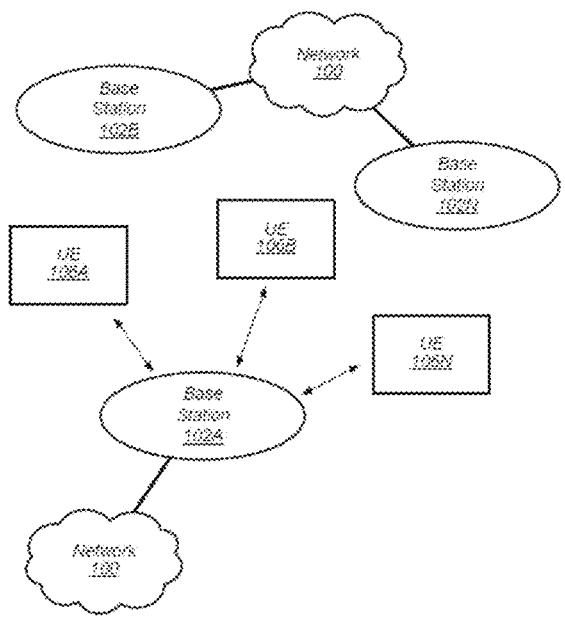
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Network-side Device—any of various types of computer systems or devices that perform communications, particularly perform wireless communication with the wireless device, such as downlink communication to the wireless device related to downlink transmission. The network-side device can be portable (or mobile) or may be stationary or fixed at a certain location. A base station is an example of a network-side device.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
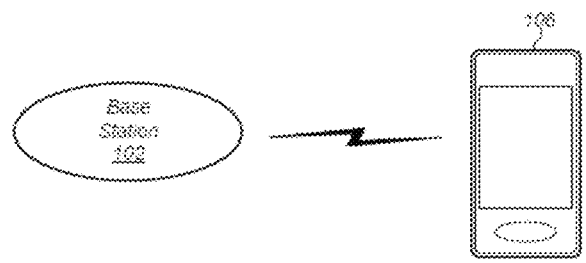
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A. 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station).

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Figure 3:
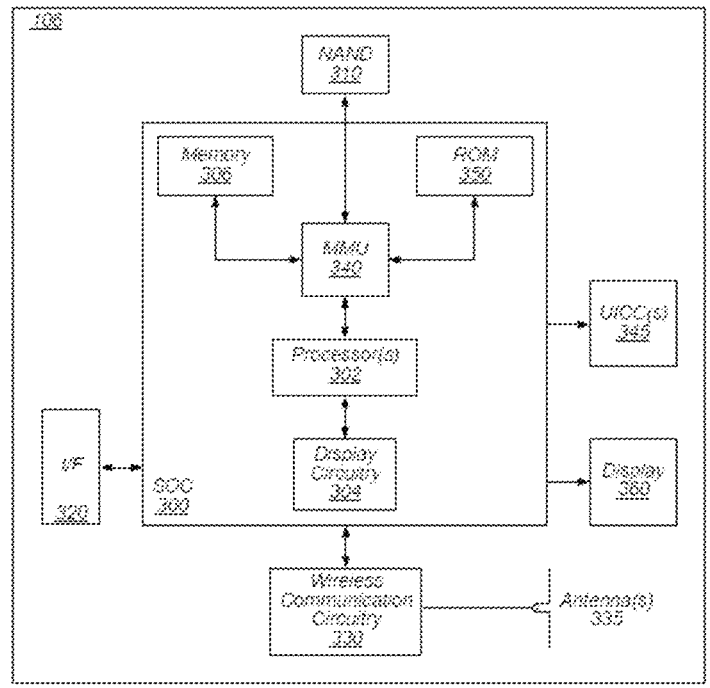
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Figure 4:
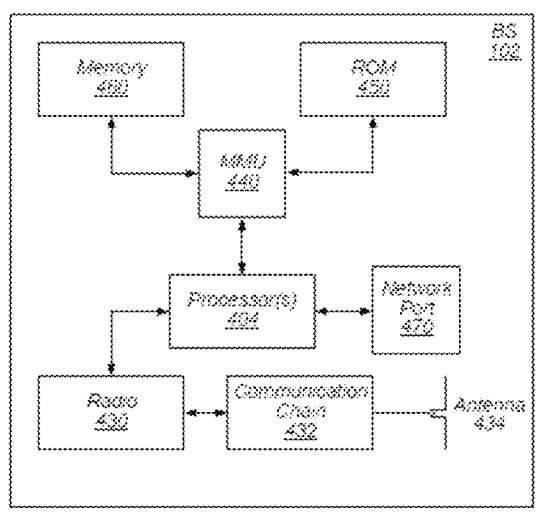
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
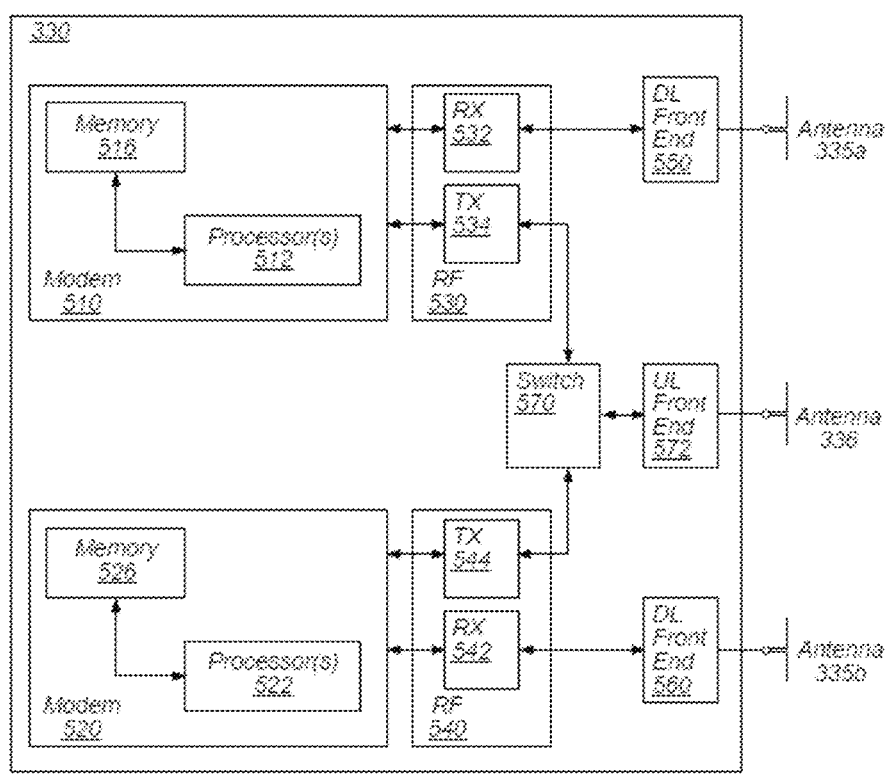
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit, other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some embodiments, the cellular communication circuitry 330 may also not include the switch 570, and the RF front end 530 or the RF front end 540 may be in communication, e.g., directly, with the UL front end 572.

Figure 6:
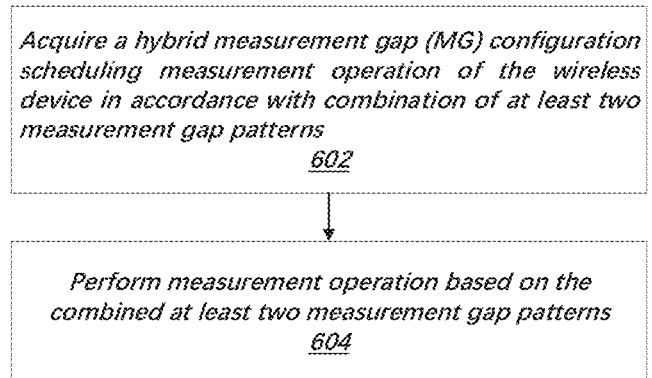
FIG. 6 is a flowchart diagram illustrating an example method for receiving a hybrid measurement gap (MG) configuration scheduling measurement operation for a wireless device, according to some embodiments.
Figure 7:
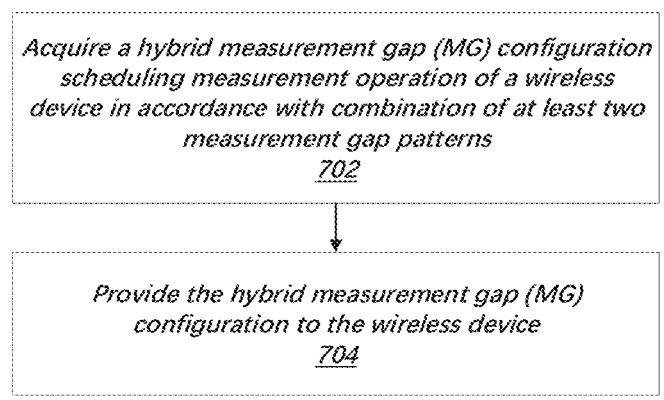
FIG. 7 is a flowchart diagram illustrating an example method for providing a hybrid measurement gap (MG) configuration scheduling measurement operation to a wireless device, according to some embodiments.

FIGS. 6-7 Hybrid Measurement Gap (MG) Configuration

New cellular communication techniques are continually under development, to increase coverage, to better serve the range of demands and use cases, and for a variety of other reasons. One technique that is currently under development may include enhancement of measurement operation by means of measurement gap. As part of such development, it would be useful to provide improved measurement gap configuration and operation.

In wireless communication, when it is required to perform measurement operation for a specific signal/parameter/indicator which may be for example, performance related, particularly a case that such measurement operation shall be performed at a different frequency point, to deal with possible inter-frequency measurement, Measurement Gap is utilized. The idea of Measurement Gap is to create a small gap, during which neither transmission nor reception occurs, thus, the wireless device can perform the corresponding measurement operation in the Measurement Gap and then switch back. Currently, the measurement operation can be performed based on measurement gap information, and for further enhancing measurement operation, the it is desired to provide an improved measurement gap configuration.

According to the new release 17 work item of measurement gap enhancement, RAN4 is to introduce some MG patterns for measurement gap operation, and in view of this, the present disclosure proposes solutions to propose enhanced MG patterns for further enhancement of measurement gap operation. In particular, the present disclosure proposes a novel design of hybrid measurement gap operation, in which an improved MG configuration including hybrid MG patterns/specification can be utilized, so that the measurement operation can be more appropriately and efficiently performed by means of flexible and appropriate MG, and thus hybrid enhancement can be achieved and can also be introduced into RAN4.

According to the present disclosure, the measurement gap operation may include any kinds of measurement operation which can be performed by means of measurement gap or any other kind of gap/interruption. For example, the measurement operation can be performed during any appropriate kinds of wireless communication operation, including such as cell switch and/or access. Carrier Aggregation including at least carrier switching and management, load aggregation, etc., at any appropriate phase/stage during the wireless communication, including such as initialization, status transition, etc., and can be utilized to measure any desired signal/parameter/indicator which may be for example, performance related, including such as SSB, PRS, etc.

According to the present disclosure, the measurement operation can be performed at any appropriate working frequency segment based on corresponding measurement gap configuration/pattern. So that when to switch/change to a working frequency segment, the measurement operation can be performed based on measurement gap pattern(s) corresponding to the working frequency segment.

According to the present disclosure, the working frequency segment may be set in accordance with the working frequency level of the wireless. According to some embodiments, the working frequency for a wireless device can be classified into any appropriate level, and accordingly, the wireless device can perform the measurement gap operation at any appropriate level. That is, the wireless device can perform the measurement gap operation in frequency segment in the level, wherein the frequency segment is divided from the working frequency in the level.

According to some embodiment of the present disclosure, the level can be selected from a group including UE level, frequency range level, band combination level, band level, Component Carrier (CC) level, Bandwidth Part (BWP) level, and the frequency segment for measurement gap operation can be that corresponding to the whole UE, to a frequency range, to a band combination, to a band, to a component carrier, to a BWP. Therefore, the measurement gap operation can be performed at the selected level with respect to the corresponding frequency segment.

Accordingly. FIGS. 6 and 7 are signal flow diagrams illustrating an example of such a solution, at least according to some embodiments. Aspects of the method of FIG. 6 may be implemented by a wireless device such as a UE 106 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. In various embodiments, some of the elements of the methods shown may be performed concurrently, in a different order than shown, may be substituted for by other method elements, or may be omitted. Additional elements may also be performed as desired.

As shown, the method of FIG. 6 may operate as follows. At 602, a wireless device may acquire a hybrid measurement gap (MG) configuration scheduling measurement operation of the wireless device in accordance with hybrid measurement gap patterns.

According to the present disclosure, the hybrid measurement gap patterns may mean any type of appropriate measurement gap pattern combination, including, not limited to, combination of individual measurement gap patterns, such as combination of at least two individual measurement gap patterns, combination of at least one individual measurement gap pattern and at least one specification/rule suitable for measurement gap operation or similar measurement operation, and so on. Note that if such specification/rule also can be equivalent to a kind of measurement gap pattern, in such a case, the combination of at least one individual measurement gap pattern and at least one specification/rule also can be equivalent to a kind of measurement gap pattern combination, and thus hybrid measurement gap patterns also may correspond to combination of measurement gap patterns. For simplicity, the description is mainly based on "measurement gap pattern", and note that herein "measurement gap pattern" actually encompass any kind of measure gap pattern/configuration, any kind of specification/rule for guiding/setting measurement gap operation or similar measurement operation, or any other kind of measurement operation mode/manner, unless otherwise specified.

According to some embodiments of the present application, the hybrid measurement gap (MG) configuration may indicate which measurement gap pattern is to be used for which frequency segment available for measurement operation. This can be indicated in any appropriate manner, for example, mapping table between measurement gap pattern (indicated by an indicator, index, etc.) and frequency segment (indicated by an indicator, index, number, etc.).

According to the present disclosure, the wireless device can acquire the hybrid measurement gap (MG) configuration in a variety of manners. According to some embodiments, the hybrid measurement gap (MG) configuration per se can be acquired from any appropriate party, such as the network-side device, a controlling device in a wireless communication system, a TRP, and so on. According to some embodiments, the hybrid measurement gap (MG) configuration can be derived by the wireless device per se, for example, the wireless device can obtain any appropriate information indicating the hybrid measurement gap (MG) configuration, such as index of hybrid measurement gap (MG) configuration, other information available for deriving the configuration, etc., and the wireless device can derive the configuration based on the information, such as by look-upping table.

At 604, the wireless device may perform the measurement operation at the frequency segment in accordance with the measurement gap pattern(s) associated with the frequency segment. According to some embodiments, in according with the hybrid measurement gap (MG) configuration, the hybrid measurement gap operation can be performed so that for a frequency segment, the measure operation can be performed based on hybrid measurement gap patterns. According to some embodiments, when the frequency segment is switched, the measurement gap operation can be performed based on measurement gap pattern(s) which may be activated/switched correspondingly. For example, when switched to a new frequency segment, the measurement operation can be performed based on measurement gap pattern (s) configured for the new frequency segment. Therefore, the hybrid measurement gap operation can be performed so that the measure operation can be performed based on different measurement gap patterns for different frequency segment.

Thus, the method of FIG. 6 may be used by a wireless device to perform improved hybrid measurement gap operation, at least according to some embodiments.

FIG. 7 may be implemented by a network-side device for example a base station such as a BS 102 illustrated in various of the Figures herein, and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

As shown, the method of FIG. 7 may operate as follows. At 702, the network-side device may acquire a hybrid measurement gap (MG) configuration scheduling measurement operation of a wireless device in accordance with hybrid measurement gap patterns.

According to the present disclosure, the network-side device can acquire the hybrid measurement gap (MG) configuration in a variety of manners. According to some embodiments, the network-side device can acquire the hybrid measurement gap (MG) configuration per se from any appropriate party, such as the network-side device, a controlling device in a wireless communication system, a TRP, and so on. According to some embodiments, the network-side device can acquire any appropriate information indicating or available for deriving a hybrid measurement gap (MG) configuration, such as an index, etc., and can determine the hybrid measurement gap (MG) configuration. According to some embodiments, the network-side device can generate/create the hybrid measurement gap (MG) configuration based on the measurement gap patterns supported by the wireless device. The information indicating the measurement gap patterns supported by the wireless device can be reported by the wireless device to the network-side device or any other appropriate device, at any appropriate phase/stage, such as cell switching, status transition, upon request or initiatively.

At 804, the network-side device may provide the hybrid measurement gap (MG) configuration to the wireless device. According to some embodiments, the network-side device can provide the hybrid measurement gap (MG) configuration pre se or any appropriate information indicating or available for deriving the hybrid measurement gap (MG) configuration to the wireless device. For example, the network-side device can acquire/create an information indicating or available for deriving the hybrid measurement gap (MG) configuration and forward the information to the wireless device.

Thus, the method of FIG. 7 may be used by a network-side device, such as a base station, to schedule an improved hybrid measurement gap operation, at least according to some embodiments.

FIGS. 8-11 illustrate further aspects that might be used in conjunction with the method of FIGS. 6 and 7 if desired. It should be noted, however, that the exemplary details illustrated in and described with respect to FIGS. 8-11 are not intended to be limiting to the disclosure as a whole: numerous variations and alternatives to the details provided herein below are possible and should be considered within the scope of the disclosure.

According to the present disclosure, the hybrid measurement gap configuration can be configured in a variety of manners so as to more appropriately support the hybrid measurement gap operation.

According to some embodiments, the hybrid measurement gap configuration may include information indicating association of measurement gap patterns with at least one frequency segment available for measurement operation. For example, the hybrid measurement gap configuration may include information indicating mapping/association between measurement gap pattern and frequency segment, such as bit, field, signal, table indicating such mapping/association.

According to some embodiments, the measurement gap patterns are that supportable by the wireless device available for measurement operation. According to some embodiments, the support of the measurement gap patterns by the wireless device can be pre-obtained by the network-side device or any other appropriate device for creating the hybrid measurement gap configuration, or can be reported by the wireless device to the network-side device or any other appropriate device. In particular, the wireless device can report the support initiatively or upon request. According to some embodiments, the obtaining/reporting of the support can be performed at any appropriate stage, such as initialization, upon cell switching/access, upon status transition, staring of measurement operation, etc.

According to some embodiments, the measurement gap pattern support information and/or the hybrid measurement gap (MG) configuration can be communicated between the network-side device and the wireless device in a variety of manners. In an example, such communication can be performed via RRC signaling, for example, the measurement gap pattern support information and/or the hybrid measurement gap (MG) configuration can be communicated via RRC layer.

According to some embodiments, a measurement gap pattern may indicate the characteristic of the gaps which can be utilized for measurement operation. In particular, the measurement gap pattern can have corresponding gap characteristics, including at least one of time duration and periodicity of the measurement gap, the object measured by using the measure gap, the frequency segment in which the measurement gap is located.

According to some embodiments, the hybrid measurement gap configuration can include information related to the measurement gap pattern. In an example, the hybrid measurement gap configuration can include measurement gap pattern index/indicator indicating a measurement gap pattern, and based on the measurement gap pattern index/indicator, the gap characteristic of measurement gap pattern can be directly derived. In such a case, the hybrid measurement gap configuration can indicate association/mapping between the measurement gap pattern index/indicator and working frequency segment index/indicator. And the wireless device when receiving the measurement gap pattern index/indicator, can obtain the gap characteristic of measurement gap pattern locally or from other appropriate party.

Additionally or alternatively, in another example, the hybrid measurement gap configuration can include information about gap characteristics of measurement gap patterns, and in such as case, the hybrid measurement gap configuration can indicate association/mapping between gap characteristics of measurement gap patterns and working frequency segment index/indicator. Note that in such a case, the hybrid measurement gap configuration may mainly indicate measurement gap characteristics of respective measurement gap pattern, without explicitly indicating measurement gap pattern ID or which gap belongs to which pattern, and thus the hybrid measurement gap configuration can equivalently mean association between gap, measurement target, and working frequency segment.

According to some embodiments, the hybrid measurement gap configuration can be configured that hybrid measurement gap patterns can be associated with a working frequency segment. According to some embodiments, the hybrid measurement gap configuration can be configured that different measurement gap patterns can be associated with different working frequency segments. Therefore, the hybrid measurement gap operation can be performed based on such association.

According to some embodiments, in according with the hybrid measurement gap (MG) configuration, the hybrid measurement gap operation can be performed so that for a frequency segment, the measure operation can be performed based on hybrid measurement gap patterns. Therefore, the hybrid measurement gap operation based on hybrid measurement gap patterns can be performed for a frequency segment. According to some embodiments, in according with the hybrid measurement gap (MG) configuration, the hybrid measurement gap operation can be performed so that for a frequency segment, the measure operation can be performed based on at least one corresponding measurement gap pattern, which may be different from or partially different from measurement gap pattern (s) corresponding to another frequency segment. In an example, a measurement gap pattern corresponds to a frequency segment, and a measurement gap pattern for a frequency segment is different from a measurement gap pattern for another frequency segment. In another example, two or more measurement gap pattern correspond to a frequency segment, and two or more measurement gap pattern can be partially overlapped with the measurement gap pattern used for other frequency segment.

Note that the hybrid measurement gap patterns can be configured in any other appropriate manner, as long as there exist at least two measurement gap patterns, or at least one measurement gap pattern combined with at least one specification are utilized during a measurement operation. And the mapping between the and frequency segment can be in any appropriate manner, such as described above. For example, even different frequency segment can have the same measurement pattern, as long as the measurement operation can utilize at least two measurement patterns or at least one measurement gap pattern combined with at least one specification for the frequency segments.

According to some embodiments, the wireless device can perform the measurement operation at the frequency segment in accordance with the measurement gap pattern(s) associated with the frequency segment as scheduled by the hybrid measurement gap (MG) configuration. That is, the wireless device can utilize the gaps configured in the gap pattern to measure a target. In an example, for a measurement target located on a frequency chain/point outside of the frequency segment, the wireless device can utilize the gap to perform inter-frequency measurement for the target. Additionally or alternatively, for a measurement target located on a frequency chain/point outside of the frequency segment, the wireless device can try to expand or switch to the frequency chain/point to perform intra-frequency measurement for the target, under a condition that a gap caused by such expansion or switching can be experienced and tolerated.

According to some embodiments, during measurement operation, when the frequency segment is switched, the measurement operation will be performed based on the measurement gap pattern corresponding to the switched frequency segment. For example, when the frequency segment is switched, the measurement gap pattern for measurement operation may be switched accordingly. For example, when switched to a new frequency segment, the measurement operation can be performed based on measurement gap pattern (s) configured for the new frequency segment. Therefore, the hybrid measurement gap operation can be performed so that the measure operation can be performed based on different measurement gap patterns for different frequency segment.

According to some embodiments, the switching of frequency segment can be instructed by the network-side device or any other appropriate device in the wireless system. According to some embodiments, such switching instruction can be communicated between the network-side device and the wireless device in a variety of manners. In an example, such communication can be performed via any of RRC layer, MAC layer, physical layer.

According to some embodiments, the network-side device can provide a switching instruction indicating switching of frequency segment. According to some embodiments, the wireless device can receive a switching instruction indicating switching of frequency segment available for measurement operation, and perform the measurement at the switched frequency segment based on the measurement gap pattern(s) associated with the operation frequency segment.

According to some embodiments, the measurement gap pattern may include a pre-configuration measurement gap pattern indicating that measurement gaps are pre-configured. Such pre-configuration measurement gap pattern may indicate a fast MG configuration, for example, the gap configuration has been pre-configured or coded in the wireless device, which can expedite the measurement operation.

According to some embodiments, the measurement gap pattern may include a multiple concurrent and independent measurement gap pattern indicating multiple concurrent and independent measurement gaps are configured. In particular, multiple concurrent and independent measurement gaps may mean gaps which can be utilized concurrently, separate and independent from each other, and can be allocated for respective frequency segments. For example, a set of concurrent and independent measurement gaps can be allocated to a frequency segment.

According to some embodiments, the measurement gap pattern may include a Network Controlled Small Gap (NCSG) pattern/specification indicating a Network Controlled Small Gap (NCSG) is utilized for the measurement operation. In particular, the Network Controlled Small Gap (NCSG) may be relate to RF adjustment, and may indicate interruptions caused when the wireless device tries to expand to or switch to a frequency chain/point to perform intra-frequency measurement for the target. That is, the Network Controlled Small Gap (NCSG) pattern/specification means a case that the wireless device can perform intra-frequency measurement for the target by expanding to or switching to a frequency chain/point corresponding to the target while withstanding the interruption caused by the expansion or switching.

According to some embodiments, the working frequency segment for measurement gap operation can be divided at an appropriate level, such as corresponding to the whole UE, to a frequency range, to a band combination, to a band, to a component carrier, to a BWP, as described above. Therefore, the measurement gap pattern can be set/configured for the appropriate working frequency segment level/unit. For example, when for the measurement operation, the working frequency segment is in the BWP level, the measurement patterns may be configured by taking a BWP as a unit. That is, the measurement pattern can be configured for at least one BWP respectively. And for other level of working frequency segment, the measurement pattern can be configured by taking such level of working frequency segment as a unit. According to some embodiments, the measurement patterns can be configured for one level of working frequency segment. According to some embodiments, the measurement patterns can be configured for two or more level of working frequency segment concurrently. For example, for different level of working frequency segment, the same or different patterns can be configured.

According to some embodiments, the hybrid measurement gap (MG) configuration can be generated/created based on support of hybrid measurement gap operation by the device. And the support of hybrid measurement gap operation by the device can be indicated in a variety of manners.

According to some embodiments, the support of hybrid measurement gap operation by the device can be presented by measurement gap pattern support information indicating supportable measurement gap patterns, and thus the hybrid measurement gap (MG) configuration can be generated/created based on the information.

According to some embodiments, the measurement gap pattern support information can indicate support of individual measurement gap patterns by the wireless device, so that the specific combination of the individual measurement gap patterns can be determined in accordance with a specific rule for creating the hybrid measurement gap (MG) configuration. In particular, when there exists a number of supportable measurement gap patterns, the hybrid measurement gap (MG) configuration may encompass all possible combination of the number of supportable measurement gap patterns, unless it is expressly stated a combination of measurement gap pattern is not allowed.

For example, the support of hybrid measurement gap operation can be indicated relying on UE capability regarding the support of individual feature. e.g. if UE indicates the support of NCSG, and UE also indicates the support of multiple concurrent and independent MG patterns (assuming these two capabilities are defined separately), then network can assume UE supports hybrid MG operation with NCSG and multiple concurrent and independent MG patterns. Of course, if UE indicates supported of NCSG, support of multiple concurrent and independent MG patterns, and support of pre-configured patterns individually, then network can assume UE supports the follow hybrid operations:

Pre-configured MG and multiple concurrent MG patterns,
Pre-configured MG and NCSG;
NCSG and multiple concurrent MG patterns; and
Pre-configured MG and multiple concurrent MG patterns and NCSG.

In particular, such determination can be performed by the network-side device or any appropriate device in the wireless system, and such measurement gap pattern support information can be pre-obtained, or can be reported by the wireless device. For example, support of individual measurement gap patterns can be presented/indicated in a variety of appropriate manners, such as bit, signal, field, etc. As an example, a binary value can be utilized to indicate whether support, 1 may indicate support, and 0 may indicate not support.

According to some embodiments, the measurement gap pattern support information can indicate support of measurement gap pattern combination by the wireless device, so that the hybrid measurement gap (MG) configuration can be created based thereon. That is, the supported combination of measurement gap patterns can be explicitly acquired, and the processing load can be reduced. Such measurement gap pattern support information can be pre-obtained, or can be reported by the wireless device For example, support of combination measurement gap patterns can be presented/indicated in a variety of appropriate manners, such as index, bit, signal, field, etc. As an example, for a type of combination, a specific indicator, such as number/symbol/index can be set, and shall be different from that for another type of combination.

For example, the support of hybrid measurement gap operation can be indicated by introducing additional UE capability. The additional UE capability can be defined separately for different combination, i.e. differentiation for the following cases is allowed: Pre-configured MG and multiple concurrent MG patterns, Pre-configured MG and NCSG, NCSG and multiple concurrent MG patterns, and Pre-configured MG and multiple concurrent MG patterns and NCSG. Such additional UE capability can be presented by newly introduced UE capability, such as new bit/instruction/command/signal, or can be conditioned on the existing UE capability, such as existing bit/instruction/command/signal, whose new value or old value with new meaning can correspond to the additional UE capability.

According to some embodiments, the measurement gap pattern support information can be indicated at any appropriate level, or with respect to any appropriate working frequency segment, as described above. For example, the additional UE capability can be indicated in the follow options:

Option 1: per UE.
Option 2: per frequency range.
Option 3: per feature set (per band per band-combination)
Option 4: per band or per band-combination
Option 5: per CC
Option 6: per BWP Hereinafter, some exemplary hybrid measurement gap operation embodiments based on different combination of measurement gap patterns will be described with reference to FIGS. 8-11. As shown in figures, the wireless device performs the hybrid measurement gap operations on BWP, please note that such BWP is only an example of the working frequency segment, and other level of working frequency segment, as described above, can be utilized similarly.

Embodiment 1 relates to a hybrid measurement gap operation based on combination of Pre-configured MG and multiple concurrent MG patterns.

Figure 8:
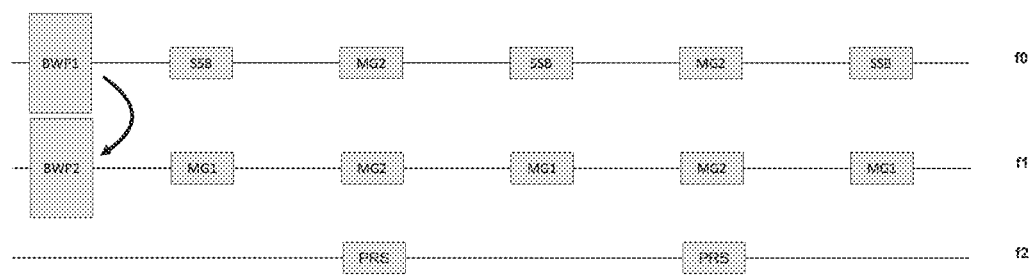
FIG. 8 illustrates an exemplary hybrid measurement pattern scenario in which Pre-configured MG pattern is combined with Multiple concurrent and independent MG patterns.

In this enhancement, network can pre-configure different multiple concurrent and independent MG patterns associated with different BWP. When BWP switching occurs, the active MG patterns shall be updated accordingly. As shown in FIG. 8, only MG2 is pre-configured associated with BWP1 while both MG1 and MG2 are preconfigured associated with BWP2. After UE switches from BWP1 to BWP2, MG1 shall be automatically enabled. After UE switches from BWP2 to BWP1, MG1 shall be automatically disabled.

When working on BWP1, UE shall measure SSB outside MG2 and measure PRS in MG2. When working on BWP2, UE shall measure SSB in MG1 and measure PRS in MG2.

Measurement period on target carrier shall follow corresponding MG pattern. In this example: When working on BWP1, measurement period on SSB shall follow intra-frequency measurement w/o gap requirements as defined in 3GPP TS38.133 clause 9.2.5. Measurement period on PRS shall follow inter-frequency PRS measurement with gap requirements as defined in TS38.133 clause 9.9. When working on BWP2, measurement period on SSB shall follow inter-frequency measurement with gap as defined in 3GPP TS38.133 clause 9.3.4, with MGRP=$MGRP_1$. Measurement period on PRS shall follow inter-frequency PRS measurement with gap as defined in TS38.133 clause 9.9, with MGRP=$MGRP_2$.

Embodiment 2 relates to a hybrid measurement gap operation based on combination of Pre-configured MG and NCSG.

Figure 9:
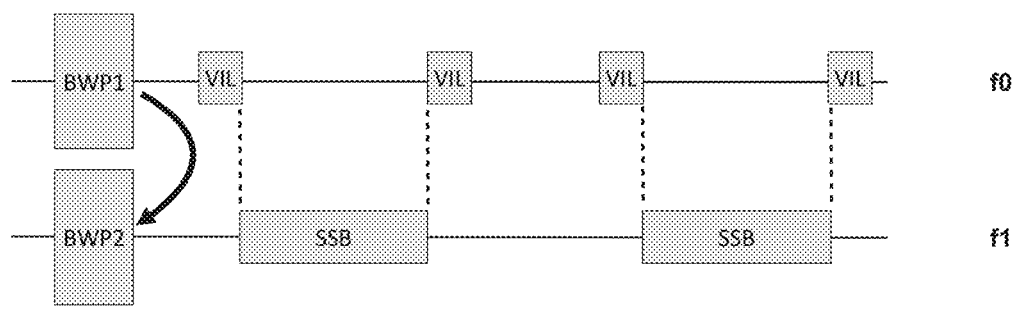
FIG. 9 illustrates an exemplary hybrid measurement pattern scenario in which Pre-configured MG pattern is combined with a Network Controlled Small Gap (NCSG) specification.

In this enhancement, network can pre-configure different NCSG with different BWP. When BWP switching occurs, the active MG patterns shall be updated accordingly. As shown in FIG. 9, NCSG is pre-configured associated with BWP1 while no MG is configured associated with BWP2. After UE switches from BWP1 to BWP2, NCSG shall be automatically disabled. After UE switches from BWP2 to BWP1, NCSG shall be automatically enabled.

Measurement period on target carrier shall follow corresponding MG pattern. In this example: When working on BWP1, UE is allowed to cause interruption with length as VIL (visible interruption length) at the beginning and the end of the target SSB due to RF adjustment, when measuring target SSB. That is, the BWP 1 can expand or switch from f0 to f1. When working on BWP2, no interruption is allowed.

Measurement period on target carrier shall follow corresponding MG pattern. In this example: When working on BWP1, measurement period on SSB shall follow NCSG measurement requirements, such NCSG measurement requirement can be any appropriate requirement, such as not substantially affect the performance of UE, the related overhead is acceptable, or other requirement, and the VIL is determined accordingly. When working on BWP2, measurement period on SSB shall follow intra-frequency measurement w/o gap requirements as defined in 3GPP TS38.133 clause 9.2.5.

Embodiment 3 relates to a hybrid measurement gap operation based on combination of NCSG and multiple concurrent MG patterns.

Figure 10:
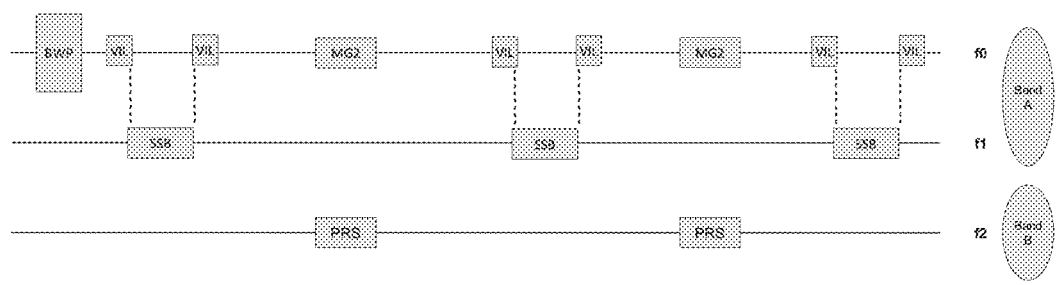
FIG. 10 illustrates an exemplary hybrid measurement pattern scenario in which Multiple concurrent and independent MG patterns are combined with a Network Controlled Small Gap (NCSG) specification.

In this enhancement, network can configure multiple concurrent and independent MG patterns including NCSG for the UE. As shown in FIG. 10, f0 and f1 are adjacent carriers on Band A. Therefore, UE can adjust its bandwidth to cover target SSB for measurement. Only NCSG is needed for this measurement. However, f2 is on Band B which is far away from Band A and UE cannot adjust it bandwidth to cover f2. If there is no spare RF chain, then network shall configure MG2 for PRS measurement.

Measurement period on target carrier shall follow corresponding MG pattern. In this example: Measurement period on SSB shall follow NCSG measurement requirements.

Measurement period on PRS shall follow inter-frequency PRS measurement with gap as defined in TS38.133 clause 9.9, with MGRP=$MGRP_2$.

Embodiment 4 relates to a hybrid measurement gap operation based on combination of Pre-configured MG and multiple concurrent MG patterns and NCSG.

Figure 11:
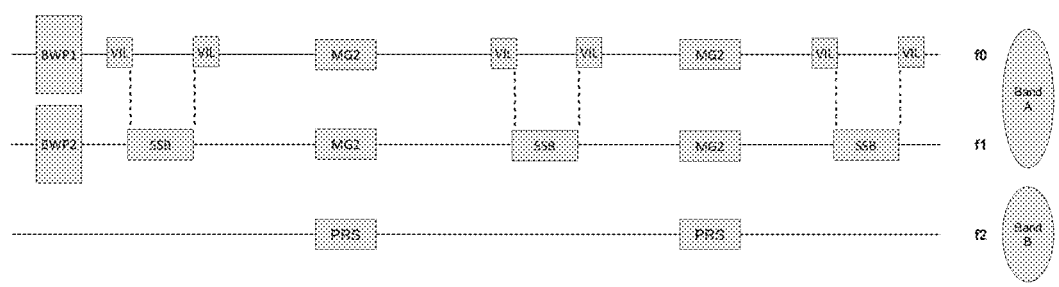
FIG. 11 illustrates an exemplary hybrid measurement pattern scenario in which a Pre-configured MG pattern, Multiple concurrent and independent MG patterns and Network Controlled Small Gap (NCSG) specification are combined.

In this enhancement, network can pre-configure multiple concurrent and independent MG patterns including NCSG for the UE, associated with different BWP. As shown in FIG. 11, f0 and f1 are adjacent carriers on Band A. Therefore. UE can adjust its bandwidth to cover target SSB for measurement. Only NCSG is needed for this measurement. However, f2 is on Band B which is far away from Band A. If there is no spare RF chain, then network shall configure MG2 for PRS measurement. After UE switches from BWP1 to BWP2. NCSG shall be automatically disabled. After UE switches from BWP2 to BWP1, NCSG shall be automatically enabled.

Measurement period on target carrier shall follow corresponding MG pattern. In this example: When working on BWP1, Measurement period on SSB shall follow NCSG measurement requirements. Measurement period on PRS shall follow inter-frequency PRS measurement with gap as defined in TS38.133 clause 9.9, with MGRP=$MGRP_2$. When working on BWP2, Measurement period on SSB shall follow intra-frequency measurement w/o gap requirements as defined in 3GPP TS38.133 clause 9.2.5. Measurement period on PRS shall follow inter-frequency PRS measurement with gap as defined in TS38.133 clause 9.9, with MGRP=$MGRP_2$.

In the following further exemplary embodiments are provided.

One set of embodiments may include a wireless device, at least one antenna; at least one radio coupled to the at least one antenna; and a processor coupled to the at least one radio; wherein the wireless device is configured to: acquire a hybrid measurement gap (MG) configuration scheduling measurement operation of the wireless device in accordance with hybrid measurement gap patterns, and perform measurement operation based on the hybrid measurement gap patterns.

According to some embodiments, wherein the hybrid measurement gap (MG) configuration includes information indicating association of measurement gap patterns with at least one frequency segment available for measurement operation, and wherein the wireless device is configured to: perform the measurement operation at the frequency segment in accordance with the measurement gap pattern(s) associated with the frequency segment.

According to some embodiments, the wireless device is further configured to: receive a switching instruction indicating switching of frequency segment available for measurement operation, and perform the measurement at the switched frequency segment based on the measurement gap pattern(s) associated with the operation frequency segment.

According to some embodiments, the wireless device is further configured to: receive the switching instruction provided via any of RRC layer, MAC layer and a physical layer.

According to some embodiments, the wireless device is configured to: report measurement gap pattern support information indicating support of individual measurement gap patterns or support of hybrid measurement gap patterns by the wireless device, so that the hybrid measurement gap (MG) configuration is set based on the measurement gap pattern support information.

According to some embodiments, the measurement gap pattern support information and/or the hybrid measurement gap (MG) configuration is communicated via RRC signaling.

According to some embodiments, the hybrid measurement gap (MG) configuration further include measurement gap information indicating at least one of time duration and periodicity of the measurement gap, the object measured by using the measure gap, the frequency segment in which the measurement gap is located.

According to some embodiments, the hybrid measurement gap (MG) configuration is set for a level at which the wireless device performs the measurement operation at a level, the level being selected from a group including UE level, frequency range level, band combination level, band level, Component Carrier (CC) level, Bandwidth Part (BWP) level.

According to some embodiments, the measurement gap pattern is selected from a group comprising: a pre-configuration measurement gap pattern indicating that measurement gaps are configured, a multiple concurrent and independent measurement gap pattern indicating multiple concurrent and independent measurement gaps are configured; and a Network Controlled Small Gap (NCSG) pattern indicating a Network Controlled Small Gap (NCSG) is utilized for the measurement operation.

Another set of embodiments may include a network-side device, comprising at least one antenna; at least one radio coupled to the at least one antenna; and a processor coupled to the at least one radio; wherein the network-side device is configured to: acquire a hybrid measurement gap (MG) configuration scheduling measurement operation of a wireless device in accordance with hybrid measurement gap patterns, and provide the hybrid measurement gap (MG) configuration to the wireless device.

According to some embodiments, the network-side device is further configured to: acquire a measurement gap pattern support information indicating support of individual measurement gap patterns by the wireless device; determine specific combination of the individual measurement gap patterns; and acquire the hybrid measurement gap (MG) configuration based on the specific combination.

According to some embodiments, the network-side device is further configured to: acquire a measurement gap pattern support information indicating support of measurement gap pattern combination by the wireless device; and acquire the hybrid measurement gap (MG) configuration based on the measurement gap pattern combination.

According to some embodiments, the network-side device is further configured to provide the hybrid measurement gap (MG) configuration via RRC signaling.

According to some embodiments, the network-side device is further configured to provide a switching instruction indicating switching of frequency segment available for measurement operation to the wireless device.

According to some embodiments, the network-side device is further configured to provide the switching instruction via any of RRC layer, MAC layer and a physical layer.

Yet another set of embodiments may include an apparatus, comprising: a processor configured to cause a wireless device to: acquire a hybrid measurement gap (MG) configuration scheduling measurement operation of the wireless device in accordance with hybrid measurement gap patterns, and perform measurement operation based on the hybrid measurement gap patterns.

According to some embodiments, the processor can cause the wireless device to implement any or all parts of any of the preceding embodiments/examples.

Yet another set of embodiments may include an apparatus, comprising: a processor configured to cause a network-side device to: acquire a hybrid measurement gap (MG) configuration scheduling measurement operation of a wireless device in accordance with hybrid measurement gap patterns, and provide the hybrid measurement gap (MG) configuration to the wireless device.

According to some embodiments, the processor can cause the network side device to implement any or all parts of any of the preceding embodiments/examples.

Yet another set of embodiments may include a method for a wireless device, comprising: acquiring a hybrid measurement gap (MG) configuration scheduling measurement operation of the wireless device in accordance with hybrid measurement gap patterns, and performing measurement operation based on the hybrid measurement gap patterns.

According to some embodiments, the method can be further performed by the wireless device to implement any or all parts of any of the preceding embodiments/examples.

Yet another set of embodiments may include a method for a network-side device, comprising: acquiring a hybrid measurement gap (MG) configuration scheduling measurement operation of a wireless device in accordance with hybrid measurement gap patterns, and providing the hybrid measurement gap (MG) configuration to the wireless device.

According to some embodiments, the method can be further performed by the network side device to implement any or all parts of any of the preceding embodiments/examples.

Another exemplary embodiment may include a device, comprising: an antenna; a radio coupled to the antenna; and a processing element operably coupled to the radio, wherein the device is configured to implement any or all parts of the preceding examples.

Yet another exemplary embodiment may include a method, comprising by a device: performing any or all parts of the preceding examples.

A yet further exemplary embodiment may include a non-transitory computer accessible memory medium comprising program instructions which, when executed at a device, cause the device to implement any or all parts of any of the preceding examples.

A yet further exemplary embodiment may include a device comprising: a processor, and a computer-readable storage medium, having program instructions stored thereon, which, when executed, cause the device to implement any or all parts of any of the preceding examples.

A still further exemplary embodiment may include a computer program product comprising instructions for performing any or all parts of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106 or BS 102) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
    at least one antenna;
    at least one radio coupled to the at least one antenna; and
    a processor coupled to the at least one radio and configured to:
        acquire a hybrid measurement gap (MG) configuration scheduling a measurement operation of the wireless device in accordance with hybrid measurement gap patterns,
        wherein the hybrid measurement gap patterns comprise a combination of a pre-configured measurement gap and multiple concurrent measurement gaps or a combination of a Network Controlled Small Gap (NCSG) and the multiple concurrent measurement gaps,
        wherein the combination of the pre-configured measurement gap and the multiple concurrent measurement gaps or the combination of the NCSG and the multiple concurrent measurement gaps comprises a first measurement gap pattern associated with a first frequency segment and a second measurement gap pattern associated with a second frequency segment,
        wherein the first measurement gap pattern is enabled when the wireless device switches from the second frequency segment to the first frequency segment, and
        wherein the first measurement gap pattern is disabled when the wireless device switches from the first frequency segment to the second frequency segment; and
        perform the measurement operation based on the hybrid measurement gap patterns.

2. The wireless device of claim 1, wherein the hybrid measurement gap (MG) configuration includes information indicating association of measurement gap patterns with at least one frequency segment available for the measurement operation, and wherein the processor is further configured to:
    perform the measurement operation at the at least one frequency segment in accordance with the measurement gap patterns associated with the at least one frequency segment.

3. The wireless device of claim 2, wherein the processor is further configured to:
    receive a switching instruction indicating switching of a frequency segment available for the measurement operation; and
    perform the measurement operation at the switched frequency segment based on the measurement gap patterns associated with the at least one frequency segment.

4. The wireless device of claim 3, wherein the processor is further configured to:
    receive the switching instruction via any of a Radio Resource Control (RRC) layer, a Medium Access Control (MAC) layer, and a physical layer.

5. The wireless device of claim 1, wherein the processor is configured to:
    report measurement gap pattern support information indicating support of individual measurement gap patterns or support of the hybrid measurement gap patterns by the wireless device, so that the hybrid measurement gap (MG) configuration is set based on the measurement gap pattern support information.

6. The wireless device of claim 5, wherein at least one of the measurement gap pattern support information or the hybrid measurement gap (MG) configuration is communicated via Radio Resource Control (RRC) signaling.

7. The wireless device of claim 1, wherein the hybrid measurement gap (MG) configuration further comprises measurement gap information indicating at least one of time duration and periodicity of a measurement gap, an object measured using the measurement gap, a frequency segment in which the measurement gap is located.

8. The wireless device of claim 1, wherein the hybrid measurement gap (MG) configuration is set for a level at which the wireless device performs the measurement operation at the level, the level being selected from a group including UE level, frequency range level, band combination level, band level, Component Carrier (CC) level, Bandwidth Part (BWP) level.

9. A network-side device, comprising:
at least one antenna;
at least one radio coupled to the at least one antenna; and
a processor coupled to the at least one radio and configured to:
acquire a hybrid measurement gap (MG) configuration scheduling a measurement operation of a wireless device in accordance with hybrid measurement gap patterns,
wherein the hybrid measurement gap patterns comprise a combination of a pre-configured measurement gap and multiple concurrent measurement gaps or a combination of a Network Controlled Small Gap (NCSG) and the multiple concurrent measurement gaps,
wherein the combination of the pre-configured measurement gap and the multiple concurrent measurement gaps or the combination of the NCSG and the multiple concurrent measurement gaps comprises a first measurement gap pattern associated with a first frequency segment and a second measurement gap pattern associated with a second frequency segment,
wherein the first measurement gap pattern is enabled when the wireless device switches from the second frequency segment to the first frequency segment, and
wherein the first measurement gap pattern is disabled when the wireless device switches from the first frequency segment to the second frequency segment; and provide the hybrid measurement gap (MG) configuration to the wireless device.

10. The network-side device of claim 9, wherein the processor is further configured to:
acquire a measurement gap pattern support information indicating support of individual measurement gap patterns by the wireless device;
determine specific combination of the individual measurement gap patterns; and
acquire the hybrid measurement gap (MG) configuration based on the specific combination.

11. The network-side device of claim 9, wherein the processor is further configured to:
acquire a measurement gap pattern support information indicating support of measurement gap pattern combination by the wireless device; and
acquire the hybrid measurement gap (MG) configuration based on the measurement gap pattern combination.

12. The network-side device of claim 9, wherein the processor is further configured to provide the hybrid measurement gap (MG) configuration via a Radio Resource Control (RRC) signaling.

13. The network-side device of claim 9, wherein the processor is further configured to provide a switching instruction indicating switching of a frequency segment available for measurement operation to the wireless device.

14. The network-side device of claim 13, wherein the processor is further configured to provide the switching instruction via any of a Radio Resource Control (RRC) layer, a Medium Access Control (MAC) layer, and a physical layer.

15. A method for a wireless device, comprising:
acquiring a hybrid measurement gap (MG) configuration scheduling a measurement operation of the wireless device in accordance with hybrid measurement gap patterns,
wherein the hybrid measurement gap patterns comprise a combination of a pre-configured measurement gap and multiple concurrent measurement gaps or a combination of a Network Controlled Small Gap (NCSG) and the multiple concurrent measurement gaps,
wherein the combination of the pre-configured measurement gap and the multiple concurrent measurement gaps or the combination of the NCSG and the multiple concurrent measurement gaps comprises a first measurement gap pattern associated with a first frequency segment and a second measurement gap pattern associated with a second frequency segment,
wherein the first measurement gap pattern is enabled when the wireless device switches from the second frequency segment to the first frequency segment, and
wherein the first measurement gap pattern is disabled when the wireless device switches from the first frequency segment to the second frequency segment; and
performing the measurement operation based on the hybrid measurement gap patterns.

16. The method of claim 15, wherein the hybrid measurement gap (MG) configuration includes information indicating association of measurement gap patterns with at least one frequency segment available for the measurement operation, and wherein the method further comprises:
performing the measurement operation at the at least one frequency segment in accordance with the measurement gap patterns associated with the at least one frequency segment.

17. The method of claim 16, further comprising:
receiving a switching instruction indicating switching of a frequency segment available for the measurement operation; and
performing the measurement operation at the switched frequency segment based on the measurement gap patterns associated with the at least one frequency segment.

18. The method of claim 17, further comprising:
receiving the switching instruction via any of a Radio Resource Control (RRC) layer, a Medium Access Control (MAC) layer, and a physical layer.

19. The method of claim 15, further comprising:
reporting measurement gap pattern support information indicating support of individual measurement gap patterns or support of the hybrid measurement gap patterns by the wireless device, so that the hybrid measurement gap (MG) configuration is set based on the measurement gap pattern support information.

* * * * *